June 20, 1939.  A. GOLDSTEIN  2,163,032
CALCULATING DEVICE
Filed Nov. 16, 1936  2 Sheets-Sheet 1
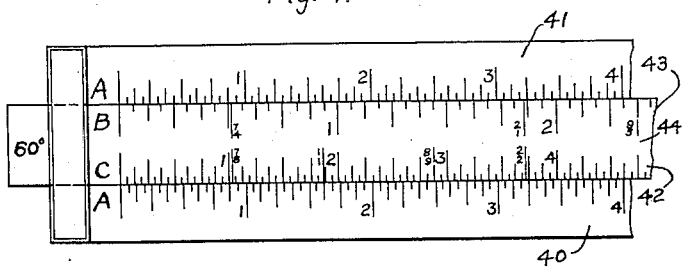
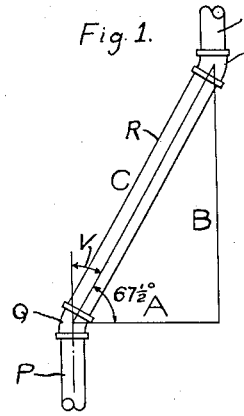
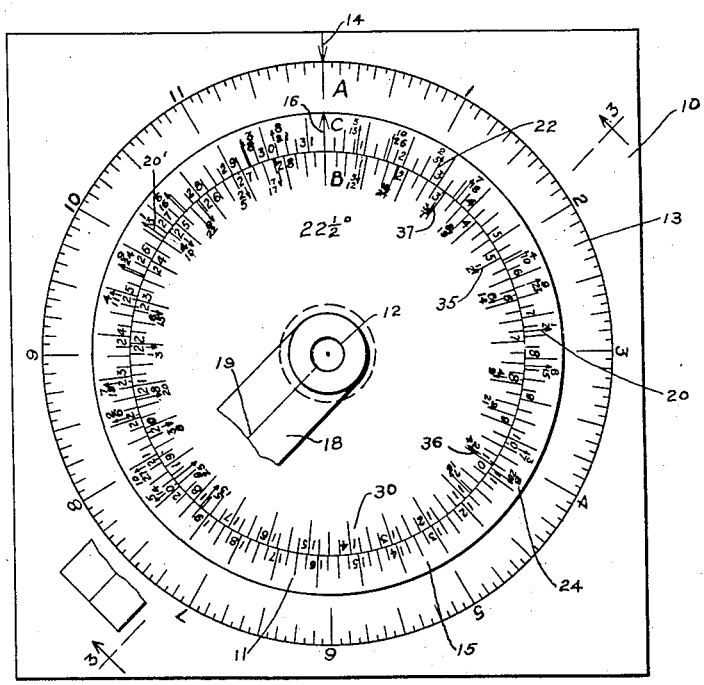
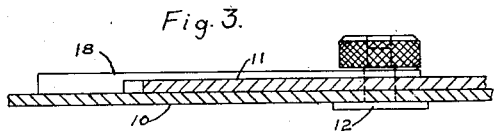
Inventor.
ALEXANDER GOLDSTEIN
by Morris Spector,
Attorney.

June 20, 1939.  A. GOLDSTEIN  2,163,032
CALCULATING DEVICE
Filed Nov. 16, 1936  2 Sheets-Sheet 2

Inventor.
ALEXANDER GOLDSTEIN
by Morris Spector,
Attorney.

Patented June 20, 1939

2,163,032

UNITED STATES PATENT OFFICE 2,163,032

CALCULATING DEVICE

Alexander Goldstein, Chicago, Ill.

Application November 16, 1936, Serial No. 111,023

5 Claims. (Cl. 235—84)

This invention relates to calculating devices and, more particularly, to devices for calculating the lengths of two sides of a triangle of a given angularity when the length of one of the sides is known. More particularly, it relates to a device for calculating the lengths of two sides of a right triangle of a given degree of acuteness when the length of the third side is known.

The device of the present invention may be constructed to indicate lengths in any unit of measure. For convenience I have used the foot as a unit of measure and subdivided the same into inches. In the simplest construction the calculating device is constructed to give the lengths of two of the sides of a triangle when the third side is of a length up to one foot. When the length of the given side is greater than one foot, or greater than the length of the scale on the device, means must be provided for giving a result which is equal to the additive results for each foot of length of the given side, plus that for the number of inches in excess of the whole number of feet of the given side. It is an object of this invention to provide a device by which this cumulative result may be readily obtained. In that form of construction my unit scale is in the form of a circle subdivided into twelve sub-units representing inches. The arrangement is such that the scale is in effect an endless scale wherein one complete turn of the scale is equal to one foot, and wherein the result obtained from a calculation of the fraction of the foot of length of the known side is added to the values resulting from any number of turns in a simple manner, without turning the scale the requisite number of times.

An explanation of the construction of the scales of my device will now be given, from which the attainment of the above and further objects of the present invention will be apparent.

In the drawings:

Figure 1 illustrates a problem in pipe lengths to be solved by the use of my device;

Figure 2 is a plan of one embodiment of my invention utilizing the rotating scale;

Figure 3 is a sectional view taken along the line 3—3 of Figure 2;

Figure 4 is a fragmentary view of my invention embodied in a longitudinally sliding slide rule;

Figure 5:
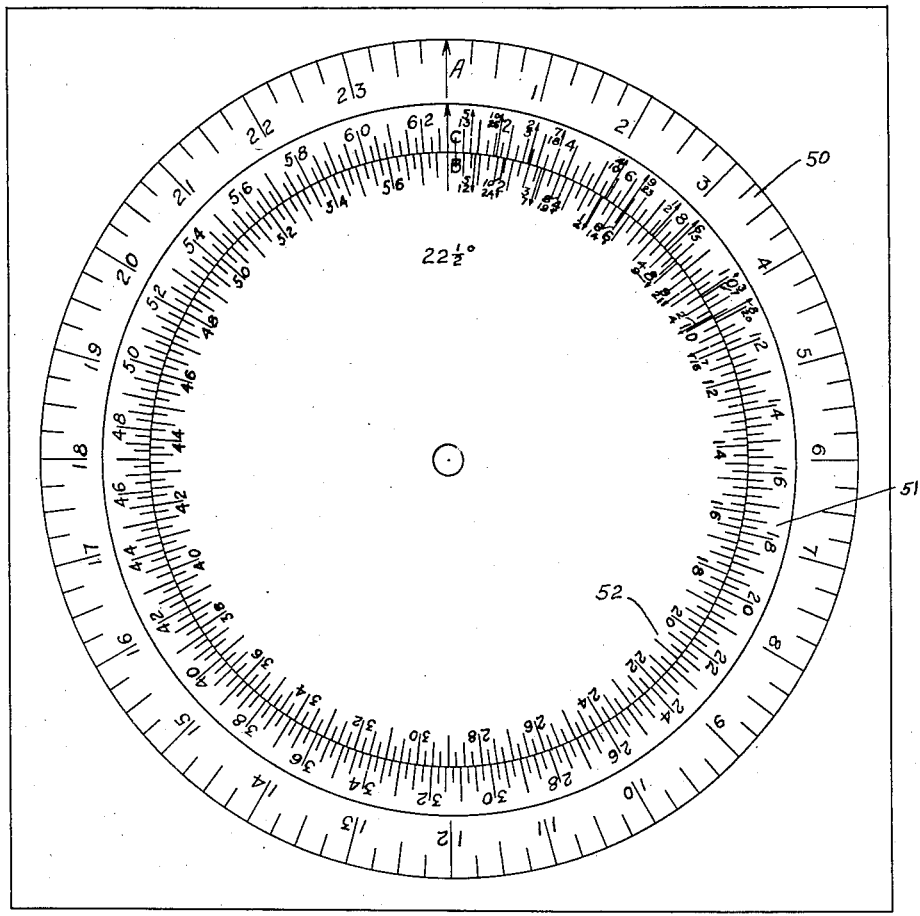
Figure 5 shows a modified construction.

Reference may now be had more particularly to Figure 1. In this figure I have shown a piping layout comprising a pipe P, an angular pipe fitting Q, another pipe R and a second fitting S connecting the pipe R with a third pipe T, so that the pipes constitute an offset in a run of piping. I have arbitrarily chosen a construction wherein the angle indicated at V is 22½ degrees. This particular angle has been chosen merely for the purpose of illustration, since the invention is equally applicable to any other angular relationship of the pipes. A right triangle is formed by the construction lines A and B wherein the line A is at right angles to the pipe P and the line B is parallel to the pipe P. The length A is therefore equal to the offset between the pipes P and T. In a given construction to be laid out, where the length of the offset A is known and the degree of angularity of the elbow Q is known, it is necessary to calculate the length of the pipe R represented by the side C of the triangle. This may be done by resorting to trigonometric tables which, however, is an impractical method of determining the same since the average pipe fitter is not familiar with the use of the trigonometric tables, and the probabilities of error are very great. In order to reduce such possibilities of error I have provided a calculating device which is simple in construction and which may be used by one having comparatively little skill, with only a negligible likelihood of error.

One form of my device is illustrated in Figures 2 and 3, to which reference may now be had. The calculating device comprises a plate 10 and a disc 11, pivotally joined together by a pivot pin 12 so that the disc 11 may turn about the plate 10. An endless circular scale 13 is drawn on the plate 10 about the pivot 12 as a center. This scale is calibrated to represent one unit of length, for instance a foot, and is subdivided into sub-units of length, in this instance inches, of which there are twelve. Each inch is further subdivided into any convenient number of subdivisions, for instance sixteen, so that the scale 13 will read in terms of inches and sixteenths of an inch. The zero point is indicated at 14. The disc 11 has a scale 15 thereon which is also a circular scale about the pivot 12 as a center. This scale has a zero mark or index at 16, and the circular scale 15 is subdivided into a number of parts. This scale is so calibrated that when the index 16 is opposite the index 14 the markings on the scale 15 bear a fixed ratio to the markings at the corresponding points of the scale 13. The scale 15 is constructed for a triangle of a given angularity, in this instance for a triangle wherein the angle V is 22½ degrees, which means that the angle between A and C is 67½ degrees. The secant of 67½ degrees is 2.613. I therefore construct the scale 15 so that the markings thereof are 2.613 times the markings or values at corresponding parts of the scale 13. It is therefore apparent that when the index marks 14 and 16 are opposite one another the length of the side C of a 67½ degree triangle, corresponding to any given length of the side A of that triangle, will be opposite the corresponding mark on the scale 13. This applies only up to a length A of one foot. A transparent pointer 18 having an indicating line 19 is pivoted about the pivot 12 to facilitate reading of the scales 13 and 15. By swinging the pointer 18 to a position such that its indicating line 19 is opposite the point on the scale 13 which corresponds to the length A, or offset of the pipe, the indicating line will be opposite that point on the scale 15 which gives the corresponding length of the line C, or length of pipe required.

I have provided an arrangement whereby my calculating device may be used to calculate lengths even if the offset is more than one foot. In order to illustrate such use consider, by way of illustration, the offset A as being of a length of one foot plus X inches. From this chart, as well as from other calculations, it may be ascertained that for one foot offset the length C should be 31.356 inches or, 2 feet and 7.356 inches. This means that the requisite length of pipe should be 2 feet and 7.356 inches plus the necessary length of C to take care of the additional X inches of offset A. At the point 7.356 inches on the scale 15 I have located an index line 20 which has a digit 1, and under it a number 2. When the length A of offset is more than one foot and less than 2 feet the disc 11 is rotated until the index line 20, marked 1, is opposite the index 14 of the scale 13. The pipe fitter then moves the pointer 18 so that the indicating line 19 is over X inches on the scale 13 and then reads the corresponding number under the indicating line 19 on the scale 15, which he considers as inches, and adds 2 feet thereto, as indicated by the inner number on the index 20. The result will give him the requisite length of pipe in feet and inches. It is apparent that what has been done by shifting the disc 11 until the index 1 is opposite the index 14 is to add 7.356 inches to the value of the reading that would otherwise be obtained on the scale 15 corresponding to X inches on the scale 13. Since 2 feet are also added to that number of inches it is apparent that the total addition is 31.356 inches, in terms of feet and inches, which is the length of C corresponding to one foot of A.

If the length of offset A is 2 feet plus X inches the operator turns the disc 11 until an index line 22 on the disc 11 is opposite the index 14. The location of the index line 22 is obtained, in the construction of the device, in the following manner. Two feet of length of offset A in this construction is equal to 62.712 inches of length C, or 5 feet and 2.712 inches. The line 22 is located at the point on the scale 15 which corresponds to 2.712 inches, and the number 5 below the number 2 indicates that five feet must be added to the reading on the scale 15. It is thus apparent that by using the index 22, which bears the digit 2 thereon, 2.712 inches are added to the reading on the scale 15 when the indicating line 19 is opposite the value X on the scale 13.

I have located indices corresponding to the indices 20 and 22, these index digits being numbered from 1 to 10 corresponding to the number of feet in the offset A, up to 10, and being located at points on the scale 15 which correspond, in terms of the scale 15, to the remainder in inches after the maximum number of full feet is subtracted from 31.356 inches multiplied by the corresponding digit 1 to 10. Under each one of these digits 1 to 10 is a number, such as the numbers 2 and 5 of the digit indices 1 and 2, which indicate the number of feet to be added to the value of the reading from the scale 15 when the corresponding digit has been moved opposite the index 14 and a reading is obtained. By way of example, suppose it is desired to ascertain the length of the pipe C required for an offset of 8 feet and 6 inches. The disc 11 is rotated until the digit 8, indicated at 24, is opposite the index 14. The pointer 18 is turned until the hair line 19 is opposite 6 on the scale 13. The value on the scale 15 opposite the indicating line 19 is then read, and to that value 20 feet is added.

On the disc 15 there is another scale, indicated at 30. This scale gives the lengths B corresponding to different lengths A in the same manner that the scale 15 gives the lengths C corresponding to the different lengths A. The scale B is constructed in the same manner as is the scale A except that the constant instead of being the secant of the angle between A and C is the tangent of that angle, in this instance 2.414. The scale 30 is also provided with a number of digit indices, indicated at 35 for one foot, 36 for two feet, 37 for three feet, etc., each one of these indices bearing the numbers 1, 2, 3, etc., indicating the corresponding number of feet in the offset A for which that index is to be used, and having a number below the indicating number, namely the numbers 2, 4, 7, etc., indicating the number of feet to be added to the value of the reading on the scale 30 when that corresponding digit index is to be used. The digit index 1 is located at the point 4.97 inches on the scale 30, which value, 4.97, is arrived at in the following manner. One foot of offset A, or 12 inches on the scale 13, is equal to 28.97 inches on the scale 30, which is 2 feet and 4.97 inches. I therefore add 2 feet to the reading to be obtained on the scale 30 and I shift the index an amount 4.97 inches on the scale 30 when the offset A is more than one foot and less than 2 feet. It is thus apparent that the scale 30 is constructed in the same manner as is the scale 15, different constants being used.

When reading either the scale 15 or the scale 30 at a time when the digit index on that scale is other than the zero digit index 16, the reading in feet and inches will be correct provided the indicating line 19 on the pointer 18 is not between the index 16 and the index 14. If the indicating line 19 is between the index 16 and the index 14 then the sum of 31.356 inches must be added to the reading on the scale 15 in addition to the number of feet indicated below the particular digit index being used. While this addition may readily be made, it is preferable not to require the user of the device to make such addition, but to provide an arrangement so that the necessity for such addition is obviated and the calculating device gives the added results. To accomplish this I provide an additional set of digit indices for the scale 15, which set of digit indices correspond respectively to the digit indices 1 to 10 inclusive on the right hand side of the zero index 16, except that this additional set of digit indices is located to the left of the digit index 16. This set of digit indices are also marked 1 to 10 inclusive. Each one of the digits of this second mentioned digit index is located a distance from the corresponding digit index to the right of the line 16 which is equal to exactly 12 inches measured on the scale 15. Thus the additional digit index 1, indicated at 20', located to the left of the zero index 16 is placed exactly 12 inches from the other digit index 1, indicated at 20. This 12 inches is not 12 inches of linear length but 12 inches by the scale 15. Each one of the other digit indices to the left of the zero digit index is likewise located 12 inches to the left of the corresponding digit index on the right hand side of the zero index, said 12 inches being measured in accordance with the inch scale 15. Each one of the digit indices to the left of the zero index has a number thereunder which is one higher than the number under the corresponding digit index to the right of the zero index, and indicates the number of feet to be added to the inch reading of the scale 15 when that digit index is used. The scale 30 is likewise provided with a series of additional digit indices to the left of the zero index, located in the same manner as are the left hand digit indices of the scale 15, except that the 12 inch unit measure is 12 inches by the scale 30, rather than by the scale 15.

Assume that it is desired to determine the length of pipe C which corresponds to an offset A equal to 1 foot 11 inches. The disc 11 is rotated until the digit index 20 is opposite the digit index 14, and the hair line 19 is brought opposite the 11 inch mark on the scale 13. At this time it is noted that the answer on the scale 15 lies between the zero index 16 and the zero index 14. This means that the index 20 cannot be used. Instead the corresponding numbered index 20', which is also numbered 1, is to be used. The disc 11 is therefore rotated until the index 20' comes under the index 14. The operator then reads the inches on the scale 15 opposite the hair line 19, and adds 3 feet thereto, which gives him the requisite length of pipe C.

The disc 11 has been constructed for a piping layout wherein the angle V is 22½ degrees. For a different angular construction a different disc must be used in connection with the plate 10. Such different disc is laid out in the same manner as is the disc 11 except that for its scale 15 the constant used is the consecant of the particular angle V and for the scale 30 the constant used is the cotangent of that angle. In ordinary pipe work the number of different angles encountered is quite few. Therefore, by providing a half a dozen or so different discs 11 in connection with the single plate 10 all probable arrangements to be encountered can be taken care of.

The disc 11 and the plate 10 are held together by a knurled nut on the pivot 12, which may be removed in order to change discs 11.

While it is desirable that the digit indices, such as the digit index 20, be located on the scale 15 this is not indispensible. For instance, when the digit index 20 is moved to a position opposite the index 14 on the scale 13, the zero index 16 is opposite the point 9.18 on the scale 13. It is therefore apparent that the results above described can be obtained by locating the digit index 20 at the point 9.18 on the scale 13 and then instructing the user of the chart to move the disc 11 until the zero point 16 comes opposite the digit index at that point on the scale 13. Such an arrangement, however, is less desirable than the present arrangement because that would preclude using the same plate 10 for different discs 15 corresponding to different angular pipe layouts.

In Figure 4 I have illustrated the principles of the present invention applied to a longitudinally moving slide rule. In this instance the scales 40 and 41 correspond to the scale 13, whereas the scales 42 and 43 correspond to the scales 11 and 30, respectively, and are laid out in exactly the same manner. The usual hair line indicating type of sliding carriage is provided with the slide rule. In this slide rule the slidable member 44 corresponds to the disc 11 and may be replaced by another member 44 calibrated for a different particular angle for the triangle A—B—C. In this case the scales 42 and 43 are provided with a plurality of digit indices corresponding to the respective digit indices on the scales 15 and 30, previously described, and located in corresponding positions. It is believed that the operation of the slide rule of Figure 4 will be apparent from the description previously given of the operation of the circular slide rule of Figure 2 and a further description thereof is not necessary.

It is, of course, to be understood that the scales 42 and 43 of the device illustrated in Figure 4 have digit indices at the right hand end corresponding to the digit indices 20' of Figure 2, similarly located.

In Figure 5 I have shown a modified construction wherein the necessity for the digit indices to the left of the index 16 is dispensed with. This result is obtained by making the scale 50, which corresponds to the scale 13, of a length of two feet, instead of one foot length. The scales 51 and 52 are, therefore, also of a length twice that of the corresponding scales 15 and 30 of Figure 2. In other respects this device is exactly the same as that of Figure 2, and is used in the same manner.

Figure 6:
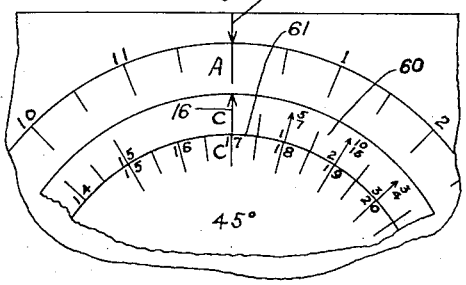
Figure 6 illustrates a fragmentary portion of still another embodiment of my invention, which embodiment is particularly applicable where the angle happens to be 45 degrees.

In Figure 6 I have shown still another construction, which is particularly applicable where the angle of the offset is exactly 45 degrees, which means that the length B is equal to the offset A, and no B scale need be provided, hence a scale corresponding to the scale 30 of Figure 2 is omitted. When this is the case I can avoid the need of the second group of digit indices which are located to the left of the index 16 in Figure 2, by continuing the scale 60, which corresponds to the scale 15, from the 16 index line around a complete circle and then continuing the same below the line 61, which is the space previously occupied by the scale 30. Thus if the answer is to be read on the scale 60 at a point between the digit index 16 and the zero point 14, then the operator reads the portion of the scale below the line 61, rather than the portion of the scale above that line.

While I have chosen to illustrate my present invention in connection with an embodiment wherein the unit of length is taken as a foot and the sub-units thereof are taken as twelfths of a foot, it is to be understood that this is merely illustrative of the principles of the invention, as any other units or sub-units may be used.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. A device for determining the length of a side of a right angle triangle of a given angularity when the length of another side is known, said device comprising two relatively movable slide members having adjacent relatively movable scales the first of which is calibrated into sub-units of at least one complete unit of measure and the second of which is calibrated as a constant multiple of said first scale, the constant being the ratio of the lengths of the two sides of a right angle triangle of the angularity for which the device is constructed, whereby when the zero index marks of the two scales are opposite one another the adjacent values on the two scales indicate corresponding lengths of two sides of said triangle up to a unit of length of one of said sides, one of said scales having a series of other index marks thereon constituting digits, each digit index being spaced from the zero point on the scale by a distance which is equal in length, in sub-units of the second scale, to the remainder after the largest possible number of whole units has been subtracted from the product of the digit and the constant multiplied by the number of sub-units per unit, said maximum number of whole units being indicated adjacent each digit index.

2. A device for determining the length of a side of a right angle triangle of a given angularity when the length of another side is known, said device comprising two relatively movable slide members having adjacent relatively movable scales the first of which is calibrated into sub-units of at least one complete unit of measure and the second of which is calibrated as a constant multiple of said first scale, the constant being the ratio of the lengths of the two sides of a right angle triangle of the angularity for which the device is constructed, whereby when the zero index marks of the two scales are opposite one another the adjacent values on the two scales indicate corresponding lengths of two sides of said right angle triangle up to a unit of length of one of said sides, one of said scales having a series of other index marks thereon constituting digits, each digit index being spaced from the zero point on the scale of a distance which is equal in length, in sub-units of the second scale, to the remainder after the largest possible number of whole units has been subtracted from the product of the digit and the constant multiplied by the number of sub-units per unit, said maximum number of whole units being indicated adjacent each digit index, a third scale on the member which has the second scale, said third scale being also adjacent said first scale but calibrated as a different constant multiple of the first scale, said different constant being the ratio of the length of the third side of the triangle to that of the known side, a second series of digit indices for said third scale, and means for indicating points on either of the two last mentioned scales corresponding to a desired point on the first scale.

3. A device for determining the length of a side of a right angle triangle of a given angularity when the length of another side is known, said device comprising two superimposed relatively rotatable members, one of said members having a circular scale divided into sub-units of measure, the second member having a circular scale opposite said first scale and calibrated as a constant multiple of said first scale, the constant being the ratio of the lengths of the two sides of a right angle triangle of the angularity for which the device is constructed, whereby when the zero points of the two scales are opposite one another the adjacent values of the two scales indicate corresponding lengths of two sides of said right angle triangle up to a unit length of one of the sides, one of said members having a series of other index marks thereon constituting digits, each digit index being spaced from the zero point on the scale of that member by circular distance which is equal to the length in sub-units on the scale of the second member of the remainder after the maximum number of whole units has been subtracted from the product of the digit and the constant multipled by the sub-units per unit, said maximum number of whole units being indicated adjacent each digit index.

4. A device for determining the length of a side of a right angle triangle of a given angularity when the length of another side is known, said device comprising two adjacent relatively movable members, one of said members having a scale divided into sub-units of measure, the other member having a scale opposite said first scale and calibrated as a constant multiple of said first scale, the constant being the ratio of the lengths of the two sides of a right angle triangle of the angularity for which the device is constructed, whereby when the zero points of the two scales are opposite one another the adjacent values of the two scales indicate corresponding lengths of two sides of said right angle triangle up to a unit length of one of the sides, said second member having a series of other index marks thereon bearing digits, each digit index being located at the point on the scale of the second member which indicates the remainder in sub-units after the maximum number of whole units has been subtracted from the product of the digit and the constant multiplied by the sub-units per unit, said maximum number of whole units being indicated adjacent each digit index.

5. A device for determining the length of a side of a right angle triangle of a given angularity when the length of another side is known, said device comprising two adjacent relatively movable members, one of said members having a scale divided into sub-units of measure, the second member having a scale opposite said first scale and calibrated as a constant multiple of said first scale, the constant being the ratio of the lengths of the two sides of a right angle triangle of the angularity for which the device is constructed, whereby when the zero points of the two scales are opposite one another the adjacent values of the two scales indicate corresponding lengths of two sides of said right angle triangle up to a unit length of one of the sides, said second member having a series of other index marks thereon, bearing digits, each digit index being located at the point on the scale of the second member which indicates the remainder in sub-units after the maximum number of whole units has been subtracted from the product of the digit and the constant multiplied by the sub-units per unit, said maximum number of whole units being indicated adjacent each digit index, said second member having another scale thereon constructed in the same manner as is the first scale thereon but a different constant multiple of the first scale, which second constant is the ratio of the length of the third side to that of the known side of the triangle for which the device is constructed.

ALEXANDER GOLDSTEIN.